Oct. 27, 1959  R. ABRAMS  2,910,635
TRIMMER CAPACITOR
Filed Nov. 4, 1953
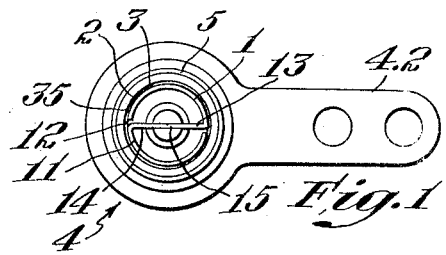
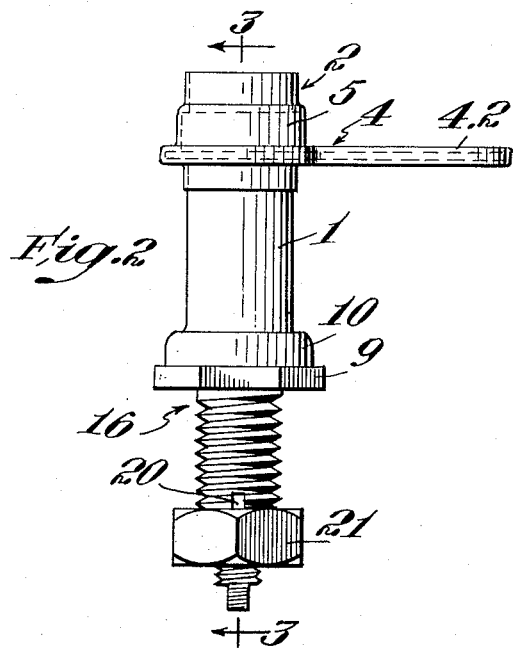
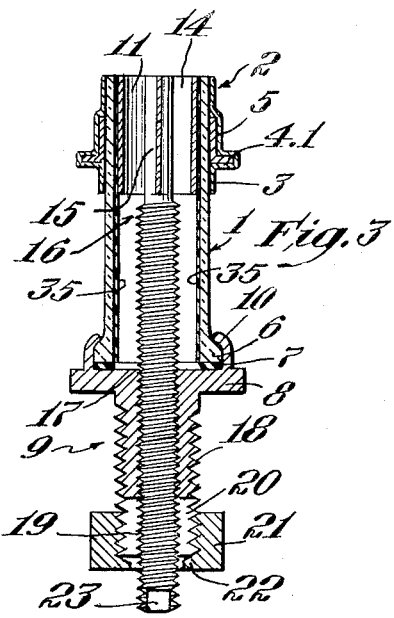
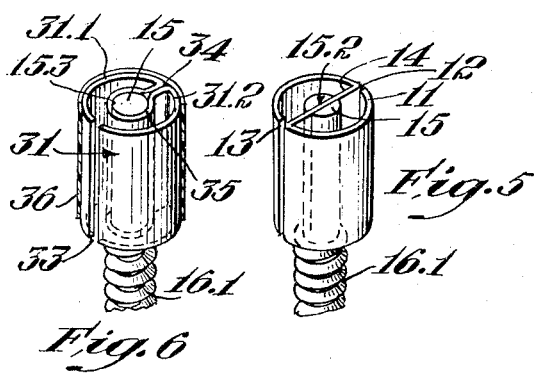
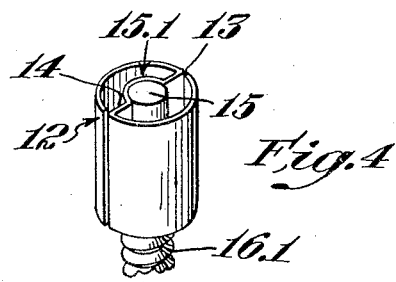
Inventor
Ralph Abrams
by Roberts, Cushman & Grover
att'ys.

2,910,635
Patented Oct. 27, 1959

2,910,635

TRIMMER CAPACITOR

Ralph Abrams, Sharon, Mass., assignor to Cambridge Thermionic Corporation, Cambridge, Mass., a corporation of Massachusetts Application November 4, 1953, Serial No. 390,210

3 Claims. (Cl. 317—249)

The present invention relates to electrical capacitors and more particularly to trimmer or padding capacitors used for the exact adjustment of capacitances in devices such as radio receivers.

Tubular trimmer capacitors of known types have defects which affect frequency stability due to the change in capacitance as a result of various factors such as sensitivity to atmospheric conditions, and mechanical expansion and contraction of parts caused by changes in ambient temperature. In the case of trimmer capacitors wherein a sliding metallic slug inside of a dielectric tube constitutes an adjustable electrode, non-linear gaps have to be accepted or the slug and tubular dielectric have to be ground to exact tolerances, which limits production and increases the cost of the finished product. This type of capacitor is also undesirable in certain instances in that constant vibration changes the setting of the capacitor. If in capacitors of this type an air gap is purposely provided between the slug head and the dielectric wall, such gap introduces a combination of air and ceramic dielectric which decreases the total dielectric constant and thus reduces the range of adjustment and the capacitance.

It is an object of the present invention to provide a trimmer capacitor whose capacitance is essentially independent of changes in atmosphere and temperature and of accidents in manufacture. Another object is to provide a trimmer capacitor of the settable sliding slug type that does not require grinding the slug head to exact tolerances so that the external diameter of the slug is substantially the same as the internal diameter of the dielectric tube. A further object is to provide a trimmer capacitor that is not subject to changing of its setting as a result of vibrations. Still another object is to provide a trimmer capacitor of the settable rotatingly sliding slug type in which substantially all air gap between the inner electrode and the dielectric is precluded and wherein the direction of adjustment does not introduce an air gap or affect residual air gap, thus providing a device of greater range of adjustment, capacitance and stability.

According to the present invention trimmer capacitors are provided which comprise a dielectric tube, a fixed plate element on the outside of the tube, an adjustable symmetrically resilient inner plate element, and a mount for said tube, which mount also provides means for adjusting and locking the inner adjustable plate. The fixed plate is constituted by an external conductive coating around one portion of the dielectric tube of material such as, for example, fired on silver paint coated with solder. The adjustable plate or electrode comprises an axially symmetrical resilient metal body having an outer diameter substantially the same as the inner diameter of the dielectric tube, this tuning body being split longitudinally to form an open space or gap where the tube is wholly uncovered so that it possesses greater resilience and more strongly adheres to and symmetrically grips the inner wall of the dielectric tube, thereby eliminating air gaps and possible change in setting as a result of vibrations. The tuning body has a threaded stud, spindle, or pin passing through a centrally threaded aperture in a mount for the dielectric tube which engagement provides a means for setting the adjustable plate which is confined to the stud over the entire width of the plate. The tube mount may be externally threaded, split and tapered at the ends, and provided with a locking nut whereby the threaded stud or pin may be locked in position. The dielectric tube can be of any sturdy dielectric material but is preferably of a ceramic nature since these materials possess highly desirable mechanical and electrical properties. The inner plate element can be connected within a circuit by way of the mounting, and the other plate element by means of a terminal or solder lug which is connected to the fixed electrode.

In a particularly desirable embodiment, the resilient metal body constituting the inner plate element is symmetrical to a longitudinal plane through its axis, so that rotation in either direction does not effect its contact with the surface wherein it moves.

These and other objects and aspects of novelty will appear from the following description of a practical embodiment of the invention. This description refers to a drawing in which Fig. 1 is the top view of a trimmer capacitor according to the invention;

Fig. 2 is the side elevation thereof;

Fig. 3 is a cross section on line 3—3 of Fig. 2; and

Figs. 4, 5 and 6 are isometric views of specific embodiments of the symmetrical resilient metal sleeve serving as the adjustable electrode.

A tube of ceramic material 1 carries the fixed plate or electrode 2 of the capacitor in the form of a coat of fired silver paint 3. A terminal member 4 with sleeve 4.1 and tail 4.2, whereby the capacitor can be connected into a circuit, is pressed over the coating 3 and a solder coat 5 covers both 3 and 4. The other end of the tube 1 has a flange 6 seated upon a rubber gasket 7, which in turn is seated in the flange 8 of a tube mount 9. The tube mount has a collar 10 which is initially vertical to the flange 8. The collar 10 is spun or swaged over flange 6 to lock tube 1 to tube mount 9.

The adjustable plate element or electrode of the capacitor according to the embodiment according to Figs. 1 to 5 consists of an S-shaped symmetrical resilient metal sleeve 11 split longitudinally at 12 and 13 and having a web 14 fixed as by a weld 15.1 (Fig. 4) or a slot arrangement 15.2 (Fig. 5) on the reduced, smooth portion 15 of a plate mount 16 having a threaded stud or pin portion 16.1. The threaded portion 16.1 screws into the centrally threaded aperture 17 of the tube mount 9, which engagement provides a means for setting the position of the adjustable plate 11. The mount 9 is externally threaded at 18 and has at its end two slots 19 and 20. A locking nut 21 has a slight taper 22 which, upon tightening the nut, presses the slotted portion of sleeve mount 9 toward the plate mount stud 16, thus firmly engaging these two parts. The stud 16 has at its outer end a flat 23 for a socket wrench or small pliers, or a screw driver slot (not shown) to facilitate the adjustment of the S-shaped sleeve electrode.

This trimmer capacitor can be mounted on a panel, frame, chassis, or similar support by means of a nut or other mechanical means such as riveting (not shown) pressing such supporting means against flange 8 and, if desired, establishing electric contact therewith. An insulating mounting can, of course, be provided if desired. Nut 21 is initially loose, to permit easy longitudinal movement of sleeve 11 by means of rotating its mount 16 from its end 23. Upon proper adjustment being obtained, nut 23 is tightened.

The symmetrically resilient sleeve 11 is initially slightly larger than the inside of the dielectric tube 1, thus providing a tight sliding fit upon insertion. The electrically effective parts are essentially symmetrical so that longitudinal relative movement has practically no effect on the performance. The sleeve 11 hugs the inside of the tube 1 evenly and symmetrically; since the open spaces or slots 12 and 13 extend the whole length of the sleeve, wedging and non-linear air gaps are substantially avoided.

The above described tuning body, although completely symmetrical as to its axis and hence unable to affect the air gap between dielectric and tuning body so far as the linear component of the adjusting movement is concerned, nevertheless might cause uncontrollable air gap distortion due to unequal amounts of binding depending on the direction of rotation. It will be evident that rotation against the open edges of the body according to Figs. 4 and 5 might cause binding whereas rotation in the opposite direction would have no such effect, so that the air gap between tube and body might depend on the direction of the adjusting movement. This effect can be with safety avoided by making the tuning body clam- or W-shaped, as shown in Fig. 6. In this figure, 16 is again the mount stud with reduced portion 15. The tuning element is a clam- or W-shaped sleeve 31 with two outer circular portions 31.1, 31.2 continuing inwardly and forming by way of webs 34 a cylindrical mounting sleeve 35 which is at 15.3 by spot welding or otherwise fastened to stud portion 15. The line parallel to the stud axis at 15.3 constitutes a hinge line joining two wings formed by the respective outer portions, webs, and inner sleeve portions, each wing being bent back on itself on a line at its web, parallel to the hinge line and the stud axis. The opposite ends of the element 31.1 and 31.2 form an open space, gap, or slit 33 and the two sleeve portions are slightly sprung outwardly prior to insertion. It will now be evident that, even if some binding should take place upon rotation, the consequent gap distortion, if any, will be the same in either direction.

In order to reduce the friction between tuning element and ceramic tube, and in order to render the fit between the dielectric and metallic members still better, it is sometimes advisable to apply an antifriction coating or lining of suitable insulating material to either lining body or ceramic tube or both. Fig. 3 shows such a lining for tube 1, at 35, and Fig. 6 shows an anti-friction coating 36 applied to tuning element 21. Slits 12, 13 and 31 are kept free of such coating material. This material can be any one of various more or less inert synthetic dielectric materials such as those now commercially available under the trade designations "Teflon," "Nylon," "Kel-F" and others.

Due to practical absence of an air gap, the total capacitance and hence the range of adjustment of devices according to the invention are at an optimum, although working to exact tolerances is not required. The inherent hugging of the dielectric tube by the adjustable metal sleeve resists loss of adjustment by vibration or shock.

It will be evident that, instead of a single S-shaped tube member 11 (Figs. 4 and 5), two similar members with crossed diagonal webs and quarter instead of semi-circular plate portions can be provided. Similarly, two W-shaped tube members can be used instead of member 31 (Fig. 6), with two opposite slots and again independent of the direction of adjustment. Instead of an even number of gaps or slots, an uneven number such as three can be provided, the advantages of the invention being provided if such gaps are arranged in polar symmetry with respect to the axis of the dielectric tube.

It should be understood that the present disclosure is for the purpose of illustration only and that this invention includes all modifications and equivalents which fall within the scope of the appended claims.

I claim:

1. A trimmer capacitor comprising a dielectric tube, an adjustable plate element including a resilient metal sleeve of clam or W-shaped cross section evenly pressed against the inner wall of said dielectric tube with a narrow open space between the sleeve edges and confined over its entire length upon one end of a threaded stud, a tube mount having a threaded opening which engages said stud for adjustment of the position of the sleeve in the dielectric tube, and means for locking the stud in a selected position of the sleeve within the tube.

2. In a trimmer capacitor of the type wherein an inner plate element is movably mounted within a dielectric tube means carrying an outer plate element, an inner plate element comprising: a stud having a portion for axially adjustable engagement with said tube means and a smooth portion; on said stud a resilient sleeve of clam-shaped cross-section with two wings that are curved around said stud symmetrically to a central hinge line with each wing bent back on itself on a line parallel to said hinge line and to the stud axis, with longitudinally extending outer wing edges adjacently opposite to and free from each other to form a narrow open space adjacent to and parallel to said hinge line where the tube means is wholly free of any wing portion, the central sleeve portion curving around said smooth stud portion, and the outer wing surfaces snugly fitting the inside of said tube means; and means for confining said sleeve over its entire length on said smooth stud portion for adjusting movement with the stud: whereby the resiliency of the sleeve especially at said lines causes it to be pressed evenly against the inner wall of the tube means.

3. A trimmer capacitor comprising: a dielectric tube, and within the tube an axially extending and axially adjustable stud means and a clam or W-shaped plate element having a central web portion and resilient metal wing portions extending therefrom, the central web portion being confined to said stud means over the entire length of the web portion for axial and rotatory movement conjointly with the stud means, and the resilient wing portions extending from the central web portion transversely symmetrical to an axial plane of the stud means snugly to contact the inside surface of the tube, the total peripheral extension of the wings being less than the periphery of said inside tube surface such as to provide a longitudinal open space between the two outer longitudinal edges of the tube contacting wing portions with the tube surface being unobstructed at that open space thus preventing any overlapping of wing portions at the tube surface and providing uniform resiliency that causes the wing portions evenly to hug the tube surface regardless of rotatory and longitudinal change of position of the plate element.

References Cited in the file of this patent

UNITED STATES PATENTS

| | | |
|---|---|---|
| 2,268,742 | Daugherty | Jan. 6, 1942 |
| 2,541,897 | Wadsworth | Feb. 13, 1951 |

FOREIGN PATENTS

| | | |
|---|---|---|
| 628,499 | Germany | Apr. 6, 1936 |
| 976,251 | France | Oct. 25, 1950 |